July 18, 1944.　　W. K. SONNEMANN　　2,354,152
SINGLE-GROUND-FAULT-DETECTING RELAY
Filed May 30, 1942
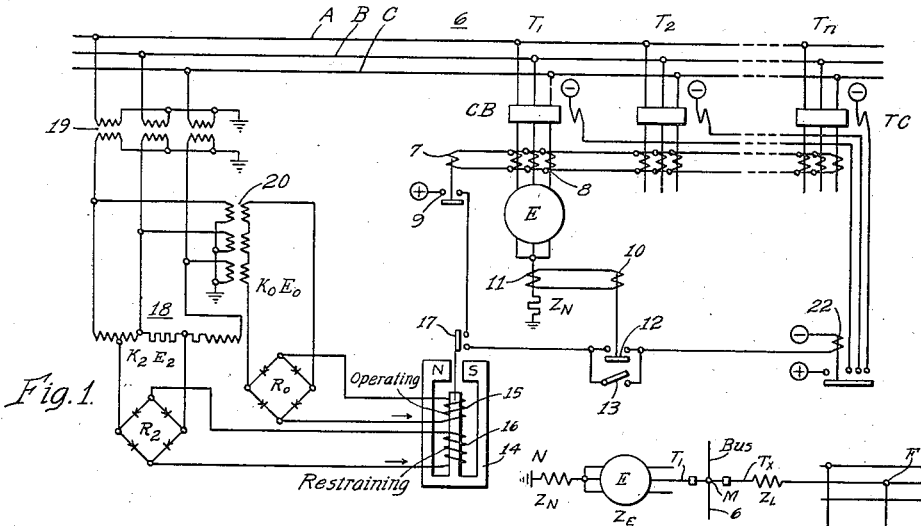
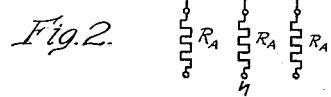
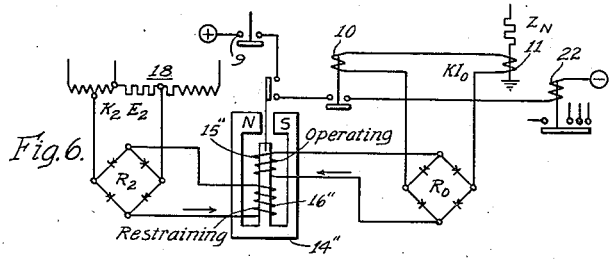
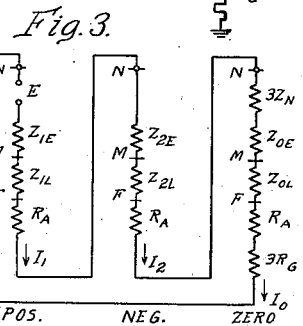
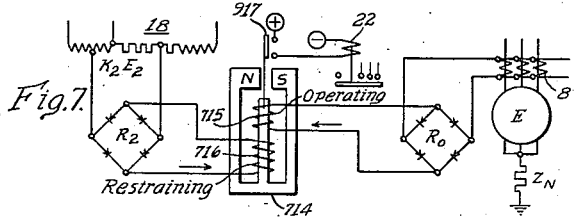
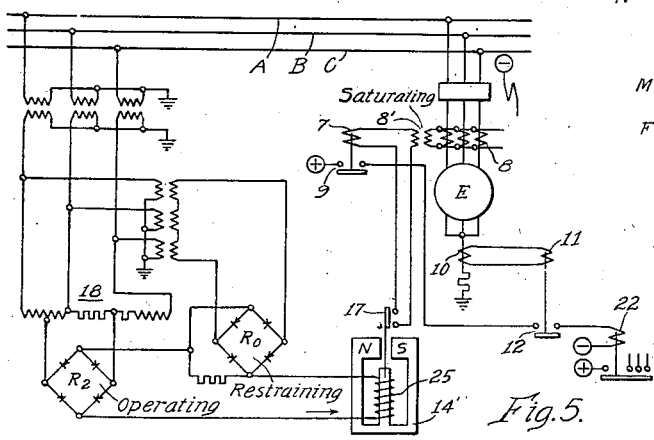
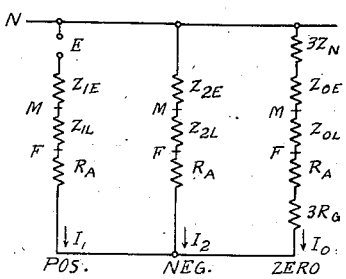
INVENTOR
William K. Sonnemann.
BY O. R. Buchanan
ATTORNEY Patented July 18, 1944

2,354,152

UNITED STATES PATENT OFFICE 2,354,152

SINGLE-GROUND-FAULT-DETECTING RELAY

William K. Sonnemann, Roselle Park, N. J., assignor to Westinghouse Electric & Manufacturing Company, East Pittsburgh, Pa., a corporation of Pennsylvania Application May 30, 1942, Serial No. 445,255

27 Claims. (Cl. 175—294)

My invention relates to a means for detecting a single-phase-to-ground fault-condition, or for distinguishing between a single and a double ground, and to relaying-systems utilizing such a detector.

In relaying problems, there has frequently arisen a need for a supervising relay which will detect the existence of a single ground-fault to the exclusion of all other kinds of faults, and while my invention has general relation to such a problem, it also has a more particular relation to the residual-current differential protection of a three-phase bus, and more particularly a generating-station bus, where the direct-current transient-problem is troublesome in causing current-transformer saturation. In such differential protective-systems, a limit of the possible sensitivity of the differential relays is reached on account of the degree of accuracy or inaccuracy of the current-transformers under heavy "through"-fault conditions, or fault-conditions outside of the protected bus or other protected apparatus, involving the flow of heavy currents flowing into and out of the bus at different terminals.

It is easy to prevent erroneous operations of a sensitive residual-current differential-relay at times of an external phase-to-phase fault, by putting the contacts of a ground-fault detector in series with the contacts of the differential relay, so as to supervise the differential relay, and lock it out of service, at all times except when the fault involves ground. It is possible, however, for a double line-to-ground fault to draw enough "through" current to make a sensitive differential residual-current relay trip falsely on apparent current-differences resulting from inaccuracies of the current-transformers, either because of current-transformer saturation, or because of inaccuracies of current-transformer calibration, but these double-ground faults also cause an actuation of the general ground-fault detectors, so that the differential ground-fault relay, as previously used, has not been supervised against such double-ground faults.

In accordance with my invention, I take advantage of the difference between the zero-phase-sequence voltage and the negative-phase-sequence voltage appearing at the bus or other protected apparatus, for detecting the difference between a single-line-to-ground fault and a double-line-to-ground fault.

With the foregoing and other objects in view, my invention consists in the apparatus, combinations, parts, systems and methods hereinafter described and claimed, and illustrated in the accompanying drawing, wherein:

Figure 1 is a diagrammatic view illustrating the application of my invention to the differential residual-current protection of a multi-terminal three-phase bus;

Fig. 2 is a schematic diagram of the bus;

Figs. 3 and 4 are diagrammatic views showing the sequence-network connections for single and double ground-faults, respectively, and Figs. 5, 6 and 7 are fragmentary views similar to Fig. 1, illustrating modifications.

In Fig. 1, I have illustrated my invention in connection with the residual-current differential-protection of a three-phase bus 6 having three phase-conductors A, B and C, and having a plurality of three-phase terminals $T_1$ to $T_n$. Each of the bus-terminals $T_1$ to $T_n$ is equipped with a circuit breaker CB having a trip coil TC, and one of the terminals $T_1$ is illustrated as being connected to a generator or other source of electromotive force, E. Most transmission systems, in this country, are grounded, sometimes solidly, but more usually through a neutral grounding-impedance, which I have indicated at $Z_N$ in the generator-neutral.

The bus 6 is shown as being protected by a residual-current differential-relay 7, the operating-coil of which is energized by the vector-sum of the residual-current components of the currents entering the bus, as obtained from a plurality of banks of current-transformers 8, one set of current-transformers being connected in each of the several three-phase terminals or circuits $T_1$ to $T_n$. The differential relay 7 has tripping-contacts 9 which are closed when the relay is adequately energized, and which may, or may not, be supervised by a suitable form of ground-fault detector 10, such as the illustrated detector energized from a current-transformer 11 in the grounded neutral-circuit of the generator E. If the ground-detector 10 is utilized, its contacts 12 are connected in series with the tripping-contacts 9 of the differential residual-current relay 7. If the ground-detector 10 is not to be utilized, its contacts 12 may be by-passed, as indicated by the switch 13.

In accordance with my invention, I provide a highly reliable means for discriminating between single and double ground-faults, or for distinguishing between a single ground-fault and any other fault-condition. My new single ground-fault detector takes advantage of the difference between the zero-phase-sequence and the negative-phase-sequence impedances of the electrical system. These two phase-sequence impedances are usually different, and they can readily be deliberately made more different. The zero-sequence impedance of transmission lines usually runs about 3.5 times as much as the negative-sequence impedance. Most transmission systems in this country are grounded through a current-limiting neutral-impedance, such as $Z_N$, which makes the zero-sequence impedance of the system considerably larger than the negative-sequence impedance.

It is possible, however, on some solidly grounded-systems, in which no neutral impedance $Z_N$ would be utilized, that the zero-sequence impedance may be less than the negative-sequence impedance. I have accordingly illustrated my invention both ways. In Fig. 1, I have shown its application to a system in which the zero-sequence impedance is larger than the negative, while in Fig. 5, I have shown its application to a system in which the zero-sequence impedance is smaller than the negative.

In Fig. 1, my single-phase-to-ground fault-detector is a differential relay, which compares the magnitudes of the zero-sequence and the negative-sequence voltages which appear at the terminals of the bus 6 or other protected apparatus. This differential detector-relay may be either quick-acting or slow-acting. I have illustrated it as a quick relay of the polarized type, as indicated at 14, having an operating-coil 15, a restraining-coil 16, and a movable contact-making member 17. The negative-sequence voltage $E_2$ of the bus 6 is obtained by means of a negative-sequence network 18 which is energized by means of a bank of potential-transformers 19 connected to the bus 6, producing a voltage $K_2E_2$, $K_2$ being a constant. The zero-sequence voltage $E_0$ is obtained from a set of auxiliary potential-transformers 20 which are shown as being energized from the bus-connected potential-transformers 19, producing a voltage $K_0E_0$, $K_0$ being a constant. In order that a polarized relay may be utilized, as shown at 14, the two derived phase-sequence voltages $K_2E_2$ and $K_0E_0$ are rectified through rectifier-bridges $R_2$ and $R_0$, respectively, as indicated. The rectified current obtained from the zero-sequence voltage $K_0E_0$ is supplied to the operating-coil 15 in such polarity as to cause the single ground-fault detector 14 to tend to close its contacts 17. The rectified current obtained from the negative-sequence voltage $K_2E_2$ is supplied to the restraining-coil 16 in such polarity as to tend to restrain the contacts 17 from closing. The contacts 17 are connected in series with the residual-current relay-contacts 9.

The operation of the apparatus shown in Fig. 1 will best be understood by referring to Fig. 2, which shows a schematic diagram of the transmission system with the generating capacity shown as an equivalent single generator E, and with a fault indicated at F on one of the feeder-circuits $T_x$. Fig. 2 shows the neutral point N, the neutral impedance $Z_n$, and the generator or other source of electromotive force E, with its impedance $Z_E$, in the generator-terminal $T_1$, the measuring point M at the bus 6, the faulted feeder $T_x$, the line-impedance $Z_L$ of the faulted feeder from the measuring-point M to the fault F, the arc-resistance $R_A$ of the fault, and the tower-footing or ground-resistance $R_G$. Figs. 3 and 4 show the sequence-network connections for single and double ground-faults, respectively. The positive, negative and zero phase-sequence components of the various impedances are indicated by adding the subscripts 1, 2 and 0, respectively. Phase-to-phase and three-phase faults need not be considered, as they involve no zero-sequence voltage for operating the single ground-fault detector 14 of Fig. 1.

The positive, negative and zero phase-sequence impedances of the electrical system may be written as follows:

$$Z_1 = Z_{1E} + Z_{1L} + R_A \quad (1)$$
$$Z_2 = Z_{2E} + Z_{2L} + R_A \quad (2)$$

and $$Z_0 = 3Z_N + Z_{0E} + Z_{0L} + R_A + 3R_G \quad (3)$$

In the case of a single phase-to-ground fault, the three phase-sequence networks are connected in series, as shown in Fig. 3, so that positive, negative, and zero phase-sequence currents are all equal, giving the relations $$I_1 = I_2 = I_0 \quad (4)$$

and $$I_1 = \frac{E}{Z_1 + Z_2 + Z_0} \quad (5)$$

The negative and zero phase-sequence voltages $E_2$ and $E_0$ which are measured at the protected apparatus, which is the bus 6, are the sequence-network voltage-drops from the neutral point N to the bus or measuring-point M, and are given by the following equations:

$$E_2 = -I_2 Z_{2E} \quad (6)$$

and $$E_0 = -I_0 (3Z_N + Z_{0E}) \quad (7)$$

My single ground-fault detector 14 develops an operating-force equal to a certain constant times a function of the measured or derived zero-sequence voltage $E_0$, and a restraining-force which is equal to the same, or a different, constant, times a function of the negative-sequence voltage $E_2$. Dividing Equation 7 by Equation 6, and remembering that $I_2 = I_0$, we can write a ratio S, between the zero-sequence operating-voltage and the negative-sequence restraining-voltage, as follows:

$$S_1 = \frac{E_0}{E_2} = \frac{3Z_N + Z_{0E}}{Z_{2E}} \quad (8)$$

In the case of a double phase-to-ground fault, the three phase-sequence networks are in parallel, as indicated in Fig. 4. Here, the positive, negative and zero phase-sequence currents are given by the equations $$I_1 = \frac{E(Z_0 + Z_2)}{Z_1 Z_0 + Z_1 Z_2 + Z_2 Z_0} \quad (9)$$

$$I_2 = -I_1 \frac{Z_0}{Z_2 + Z_0} \quad (10)$$

and $$I_0 = -I_1 \frac{Z_2}{Z_2 + Z_0} \quad (11)$$

The measured voltages $E_2$ and $E_0$ are expressed by the previously indicated Equations 6 and 7, but the currents $I_2$ and $I_0$ are different, as indicated by Equations 10 and 11. Substituting the new values for the currents $I_2$ and $I_0$, I obtain the following equations for the measured voltages in the case of a double-ground fault:

$$E_2 = I_1 \frac{Z_0 Z_{2E}}{Z_2 + Z_0} \quad (12)$$

and $$E_0 = I_1 \frac{Z_2 (3Z_N + Z_{0E})}{Z_2 + Z_0} \quad (13)$$

We can now obtain a new ratio $S_2$ between the zero-sequence operating-voltage $E_0$ and the negative-sequence restraining-voltage $E_0$, as shown by the equation $$S_2 = \frac{E_0}{E_2} = \frac{Z_2(3Z_N + Z_{0E})}{Z_0 Z_{2E}} = \frac{Z_2}{Z_0} S_1 \qquad (14)$$

If the single ground-fault detector 14 is to discriminate properly between the conditions existing for single and double ground-faults, so that the relay will respond when the ratio $S_1$ is equal to, or greater than, unity or other predetermined value, depending upon the constants which are used in the construction of the relay, such as the number of turns, etc., and so that the relay will not respond when the ratio $S_2$ is less than unity or whatever other predetermined value was assigned for the ratio $S_1$, then the ratio $S_1$ must be greater than $S_2$. Dividing Equation 8 by Equation 14, it is found that the ratio of $S_1$ to $S_2$ is equal to the ratio between the zero and negative phase-sequence impedances of the entire electrical system, regardless of the location of the external fault F, that is, regardless of the value of the line-impedance $Z_L$ between the bus 6, or measuring-point M, and the fault F. There results $$\frac{S_1}{S_2} = \frac{Z_0}{Z_2} \qquad (15)$$

Equation 15 indicates that if $Z_0/Z_2$ is greater than 1, then $S_1/S_2$ is also greater than 1, and my single ground-fault detector 14 will receive more restraining-voltage in proportion to operating-voltage, for the double phase-to-ground fault conditions, than it will receive for the single phase-to-ground fault.

It is obvious that any desired factor of safety may be introduced, in the operation of my single ground-fault detector 14, by making the ratio $Z_0/Z_2$ as large as may be desired, as by making the grounding-resistance $Z_n$ as large as may be desired. A ratio of $Z_0/Z_2$ having the value 2/1 provides a small operating factor of safety, making it feasible to design the single ground-fault detector-relay 14 so as to properly discriminate between single and double ground-faults. It is entirely feasible, and usually preferable, however, to have a larger ratio of $Z_0/Z_2$, of the order of 6/1 or 18/1. In one transmission system, for which my single ground-fault detector was designed, the ratio $Z_0/Z_2$ was actually 180/1.

It should be noted that my new relay responds to the relative values of the zero and negative phase-sequence impedances of the entire system, up to the fault, regardless of the distribution or location of the components which make possible the respective impedances $Z_0$ and $Z_2$. It is usually important, however, to make sure that the zero-sequence impedance $Z_0$ is large by including a suitable grounding-impedance $Z_N$ at the generating station. No reliance can be placed upon the fact that the zero-sequence impedance $Z_L$ of the transmission-lines or feeders which are indicated at the terminals $T_2$ to $T_n$ is larger than the negative-sequence impedance, because if the relay requires a large $Z_0$ in order to discriminate properly, then the large ratio of $Z_0$ to $Z_2$ should hold true for any fault-location for which the relay is expected to discriminate, and if the fault is located close to the relaying-bus 6, then obviously the feeder-component $Z_L$ will not be available to increase $Z_0$. For obvious reasons, a large tower-grounding resistance $R_G$ could not safely be relied upon to make $Z_0$ large enough in every case of fault.

Since there is no zero-sequence operating-voltage for actuating my single ground-fault detector 14 in the case of an ungrounded phase-to-phase fault or a three-phase fault on a system having a high $S_1/S_2$ ratio, and since my single ground-fault detector is built so that its negative-sequence-responsive restraining-force is larger than the zero-sequence-responsive operating-force in the event of a double line-to-ground fault, it follows that my new single ground-fault detector 14, as shown in Fig. 1, will not respond at all, for any fault-condition, at any point external or internal to the protected bus 6, except in the sole case of a single line-to-ground fault. It is not necessary, therefore, in the residual-current differential bus-protecting system, shown in Fig. 1, to utilize the conventional ground-fault detector 10, or its equivalent, for locking out the differential relay 7 in the event of a fault not involving ground, as my new single ground-fault detector 14 locks out the differential relay 7, not only for faults which do not involve ground, but also for faults involving two of the phase-conductors and ground. The possibility of omitting the ground-detector 10 has been indicated, in Fig. 1, by means of a shunting-circuit including a switch 13 which, when closed, effectually locks the ground-detector 10 out of service.

Some sort of ground-fault detector, such as that indicated at 10 in Fig. 1, will frequently be found desirable, from an engineering standpoint, even in circuits having a ratio $S_1/S_2$ greater than one, in order to avoid depending upon my sensitive single ground-fault detector 14 not to respond in the event of a heavy external fault-condition at a time when the zero-sequence voltage is zero, so that the single-ground detector is supposedly totally deenergized under such conditions, provided that the potential transformer-ratios are accurate. The advantage of retaining the generator ground-fault detector 10 is that in certain cases a greater amount of energy may be available for operating this detector from a current-transformer 11 in the station-neutral, so that it can be given a much heavier spring-setting, thus making it quite certain not to operate from shock, or from any other cause, during an external three-phase fault.

In the particular system shown in Fig. 1, the differential residual-current relay 7, supervised by my new single ground-fault detector 14, either with, or without, the addition of a ground-fault detector 10, is utilized to energize a multi-contact tripping-relay 22, which energizes the trip-coils TC of all of the circuit breakers CB which are connected to the various bus-terminals $T_1$ to $T_n$.

While I have illustrated my invention, in Figs. 1 to 4, in connection with a system having a larger zero-sequence impedance $Z_0$ than its negative-sequence impedance $Z_2$, nevertheless, my invention is also applicable to systems in which the ratio $Z_0/Z_2$ may be less than unity, and in which it is not desired to insert enough grounding-resistance $Z_n$ to make this ratio larger than unity. In such a case, the restraining force of the relay may be derived from the zero-sequence voltage, rather than the negative-sequence voltage, and the operating force may be derived from the negative-sequence voltage. This may be done by the simple expedient of reversing the two coils 15 and 16 of the single ground-fault detector 14 in Fig. 1.

In Fig. 5, I have illustrated a system in which the ratio $Z_0/Z_2$ is less than unity, and the single ground-fault detector 14' is operated in response to the rectified negative-sequence voltage E₂, and restrained in response to the rectified zero-sequence voltage E₀. Instead of utilizing two separate coils 15 or 16 on a common magnetic circuit, I have illustrated, in Fig. 5, an equivalent energizing-means utilizing a single relay-coil 25 on the polarized relay 14′, with the two rectified-voltage sources connected in series-opposition, for energizing the single coil 25.

It is, of course, to be understood, that either form of embodiment of my invention may have either one or two coils, or any other operating-arrangement whereby an operating force is developed in response to one relaying-quantity, and a restraining force is developed in response to the other relaying-quantity, and the response may be either a direct response to the first power of the relaying-quantity, or any other response, such as a response to the square of the quantity involved. In fact, my single ground-fault detector 14 or 14′ is to be regarded as representative of any type of differential relay, either high-speed or slow-speed, and either linearly or non-linearly responsive, although advantage is to be derived, in many cases, from the high speed of operation and the low relay-burden which is obtained with a polarized relay using rectified relaying-currents, as illustrated.

In Fig. 5, I have also indicated an alternative connection of the single ground-fault detector 14′ whereby it is utilized to supervise the residual-current differential-relay 7; and this alternative connection is applicable also to the detector 14 of Fig. 1. In Fig. 5, instead of putting the relay-contacts 9 and 17 in series, I have shown the so-called "torque-control" of the residual differential relay 7, wherein the supervisory relay-contacts 17 are connected in series with the differential-relay-coil 7, so that the differential relay is not given a chance to operate at all unless the fault is a single phase-to-ground fault. In order to avoid open-circuiting the current-transformers 8, an auxiliary saturating transformer 8′ is utilized to energize the coil 7 through the contacts 17, from the banks of current-transformers 8.

The single-ground detector 14′ in Fig. 5 is so designed that the relay will not operate for double phase-to-ground short-circuits, but will operate for single phase-to-ground short-circuits on the electrical system. Mathematical derivations can be worked out to show that this can be done in a manner similar to that described in connection with Figs. 1 to 4. It should be noted, in the case of Fig. 5, however, that the relay will also respond to ungrounded phase-to-phase faults, because, under these conditions, there would be no zero-sequence voltage to restrain the relay. Thus, in the case of Fig. 5, it is necessary to utilize some sort of ground-detector, such as that indicated at 10, for distinguishing between faults involving no zero-sequence current and faults involving zero-sequence currents. The by-passing circuit 13 cannot be utilized, therefore, in Fig. 5.

In Fig. 6, I have illustrated an alternative mode of energization for the single-phase-to-ground detector 14 of Fig. 1, to emphasize the fact that the detector may respond to any electrical quantity of the bus or other protected apparatus, rather than voltage. Although, for practical reasons, it may be necessary to rely on negative-sequence voltage for restraint, there are many cases in which it is possible and practical to energize the operating coil with a rectified relaying-quantity which is derived from the zero-sequence current rather than the zero-sequence voltage. Thus, in Fig. 6, I have shown a single-ground-fault-detector 14″ having an operating-coil 15″ energized, through the rectifier-bridge R₀, from the current-transformer 11 which is connected in the station-neutral, which supplies a current KI₀ which is a function of the zero-sequence current I₀. The restraining-coil 16″ is energized, through the rectifier-bridge R₂, from the negative-sequence voltage-network 18, as in Fig. 1. The other connections of Fig. 6 are, or may be, as shown in Fig. 1.

In Fig. 7, I have illustrated a still further variation in which the residual-current differential-relay 7 of Fig. 1, and the single-phase-to-ground detector 14 are combined in a single relay 714 in which, in effect, the residual-current differential-relay is provided with negative-sequence voltage-restraint. Thus, the relay 714 in Fig. 7 is illustrated as a polarized relay having an operating-coil 715 energized, through the rectifier-bridge R₀, from the summated residual currents of the various sets of current-transformers 8. The relay also has a restraining-coil 716 energized, through the rectifier-bridge R₂, from the negative-sequence voltage-network 18. The contacts 917 of the relay 714 may be utilized to energize the tripping-relay 22. Although this mode of energization of the single-phase-to-ground fault-detector does not appear to be as desirable, from many aspects, as that shown in Fig. 1, principally due to current-transformer saturation resulting from direct-current transients, yet it may be adequate where extreme simplicity is required.

While I have illustrated my invention in several preferred forms of embodiment, I wish it to be understood that the general principles of my invention are susceptible of embodiment in other forms and applications, and with other types of the various relaying-elements, so long as the general principles of comparing the magnitudes of the negative and zero phase-sequence voltages are observed. I desire, therefore that the appended claims shall be accorded the broadest construction consistent with their language and the prior art.

I claim as my invention:

1. The combination, with a three-phase apparatus, of means for deriving, from the apparatus, a first relaying-quantity which is selectively responsive to a negative-sequence electrical quantity of the apparatus at the relaying-point, means for deriving, from the apparatus, a second relaying-quantity which is selectively responsive to a zero-sequence electrical quantity of the apparatus at the same relaying-point, and relaying-means for differentially comparing the magnitudes of said two relaying quantities.

2. The combination, with a three-phase apparatus, of means for deriving, from the apparatus, a first relaying-quantity which is selectively responsive to the negative-sequence voltage of the apparatus at the relaying-point, means for deriving, from the apparatus, a second relaying-quantity which is selectively responsive to the zero-sequence voltage of the apparatus at the same relaying-point, and relaying-means for differentially comparing the magnitudes of said two relaying quantities.

3. The combination, with a three-phase apparatus which is a part of a three-phase transmission-system, of protective-means for reliably distinguishing between a single line-to-ground fault-condition within the protected apparatus and a "through" fault-condition, said protective-means comprising, and being responsive to, a sensitive differential residual-current relay for responding to ground-faults within the protected apparatus, a ground-fault detector-relay for responding to the existence of a ground-fault somewhere in the transmission system, and single-ground detector-means for distinguishing between single line-to-ground faults and double line-to-ground faults somewhere in the transmission system.

4. The invention as defined in claim 3, characterized by said single-ground detector-means comprising means for deriving, from the protected apparatus, a first relaying-quantity which is selectively responsive to a negative-sequence electrical quantity of the protected apparatus, means for deriving, from the protected apparatus, a second relaying-quantity which is selectively responsive to a zero-sequence electrical quantity of the protected apparatus, and relaying-means for differentially comparing the magnitudes of said two relaying-quantities.

5. The invention as defined in claim 3, characterized by said single-ground detector-means comprising means for deriving, from the protected apparatus, a first relaying-quantity which is selectively responsive to the negative-sequence voltage of the protected apparatus, means for deriving, from the protected apparatus, a second relaying-quantity which is selectively responsive to the zero-sequence voltage of the protected apparatus, and relaying-means for differentially comparing the magnitudes of said two relaying-quantities.

6. The combination, with a three-phase apparatus having a zero-phase-sequence impedance which is materially different from its negative-phase-sequence impedance, of means for deriving, from the apparatus, a first relaying-quantity which is selectively responsive to a negative-sequence electrical quantity of the apparatus at the relaying-point, means for deriving, from the apparatus, a second relaying-quantity which is selectively responsive to a zero-sequence electrical quantity of the apparatus at the same relaying-point, and relaying-means for differentially comparing the magnitudes of said two relaying-quantities in such manner that the relaying-quantity corresponding to the phase-sequence of the larger of the two above-mentioned phase-sequence impedances of the apparatus tends to operate said relaying-means.

7. The combination, with a three-phase apparatus having a zero-phase-sequence impedance which is materially different from its negative-phase-sequence impedance, of means for deriving, from the apparatus, a first relaying-quantity which is selectively responsive to the negative-sequence voltage of the apparatus at the relaying-point, means for deriving, from the apparatus, a second relaying-quantity which is selectively responsive to the zero-sequence voltage of the apparatus at the same relaying-point, and relaying-means for differentially comparing the magnitudes of said two relaying-quantities in such manner that the relaying-quantity corresponding to the phase-sequence of the larger of the two above-mentioned phase-sequence impedances of the apparatus tends to operate said relaying-means.

8. The combination, with a three-phase apparatus which is a part of a three-phase transmission-system having a zero-phase-sequence impedance which is materially different from its negative-phase-sequence impedance, of protective-means for reliably distinguishing between a single line-to-ground fault-condition within the protected apparatus, and a "through" fault-condition, said protective-means comprising, and being responsive to, a sensitive differential residual-current relay for responding to ground-faults within the protected apparatus, a ground-fault detector-relay for responding to the existence of a ground-fault somewhere in the transmission system, and single-ground detector-means for distinguishing between single line-to-ground faults and double line-to-ground faults somewhere in the transmission system, said single-ground detector-means comprising means for deriving, from the protected apparatus, a first relaying-quantity which is selectively responsive to a negative-sequence electrical quantity of the protected apparatus, means for deriving, from the protected apparatus, a second relaying-quantity which is selectively responsive to a zero-sequence electrical quantity of the protected apparatus, and relaying-means for differentially comparing the magnitudes of said two relaying-quantities in such manner that the relaying-quantity corresponding to the phase-sequence of the larger of the two above-mentioned phase-sequence impedances of the system tends to operate said relaying-means.

9. The combination, with a three-phase apparatus which is a part of a three-phase transmission-system having a zero-phase-sequence impedance which is materially different from its negative-phase-sequence impedance, of protective-means for reliably distinguishing between a single line-to-ground fault-condition within the protected apparatus, and a "through" fault-condition, said protective-means comprising, and being responsive to, a sensitive differential residual-current relay for responding to ground-faults within the protected apparatus, a ground-fault detector-relay for responding to the existence of a ground-fault somewhere in the transmission system, and single-ground detector-means for distinguishing between single line-to-ground faults and double line-to-ground faults somewhere in the transmission system, said single-ground detector-means comprising means for deriving, from the protected apparatus, a first relaying-quantity which is selectively responsive to the negative-sequence voltage of the protected apparatus, means for deriving, from the protected apparatus, a second relaying-quantity which is selectively responsive to the zero-sequence voltage of the protected apparatus, and relaying-means for differentially comparing the magnitudes of said two relaying-quantities in such manner that the relaying-quantity corresponding to the phase-sequence of the larger of the two above-mentioned phase-sequence impedances of the system tends to operate said relaying-means.

10. The combination, with a three-phase apparatus having a zero-phase sequence impedance which is materially larger than its negative-phase-sequence impedance, of means for deriving, from the apparatus, a first relaying-quantity which is selectively responsive to a negative-sequence electrical quantity of the apparatus at the relaying-point, means for deriving, from the apparatus, a second relaying-quantity which is selectively responsive to a zero-sequence electrical quantity of the apparatus at the same relaying-point, and relaying-means for differentially comparing the magnitudes of said two relaying-quantities in such manner that the second relaying-quantity tends to operate said relaying-means.

11. The combination, with a three-phase apparatus having a zero-phase sequence impedance which is materially larger than its negative-phase-sequence impedance, of means for deriving, from the apparatus, a first relaying-quantity which is selectively responsive to the negative-sequence voltage of the apparatus at the relaying-point, means for deriving, from the apparatus, a second relaying-quantity which is selectively responsive to the zero-sequence voltage of the apparatus at the same relaying-point, and relaying-means for differentially comparing the magnitudes of said two relaying-quantities in such manner that the second relaying-quantity tends to operate said relaying-means.

12. The combination, with a three-phase apparatus which is a part of a three-phase transmission-system having a zero-phase-sequence impedance which is materially larger than its negative-phase-sequence impedance, of protective-means for reliably distinguishing between a single line-to-ground fault-condition within the protected apparatus and a "through" fault-condition, said protective means comprising, and being responsive to, a sensitive differential residual-current relay for responding to ground-faults within the protected apparatus, and single-ground detector-means for distinguishing between single line-to-ground faults and double line-to-ground faults somewhere in the transmission system, said single-ground detector-means comprising means for deriving, from the protected apparatus, a first relaying-quantity which is selectively responsive to a negative-sequence electrical quantity of the protected apparatus, means for deriving, from the protected apparatus, a second relaying-quantity which is selectively responsive to a zero-sequence electrical quantity of the protected apparatus, and relaying-means for differentially comparing the magnitudes of said two relaying-quantities in such manner that the second relaying-quantity tends to operate said relaying-means.

13. The combination, with a three-phase apparatus which is a part of a three-phase transmission-system having a zero-phase-sequence impedance which is materially larger than its negative-phase-sequence impedance, of protective-means for reliably distinguishing between a single line-to-ground fault-condition within the protected apparatus and a "through", fault-condition, said protective means comprising, and being responsive to, a sensitive differential residual-current relay for responding to ground-faults within the protected apparatus, and single-ground detector-means for distinguishing between single line-to-ground faults and double line-to-ground faults somewhere in the transmission system, said single-ground detector-means comprising means for deriving, from the protected apparatus, a first relaying-quantity which is selectively responsive to the negative-sequence voltage of the protected apparatus, means for deriving, from the protected apparatus, a second relaying-quantity which is selectively responsive to the zero-sequence voltage of the protected apparatus, and relaying-means for differentially comparing the magnitudes of said two relaying-quantities in such manner that the second relaying-quantity tends to operate said relaying-means.

14. The combination, with a three-phase apparatus which is a part of a three-phase transmission-system having a zero-phase-sequence impedance which is materially larger than its negative-phase-sequence impedance, of protective-means for reliably distinguishing between a single line-to-ground fault-condition within the protected apparatus and a "through" fault-condition, said protective-means comprising, and being responsive to, a sensitive differential residual-current relay for responding to ground-faults within the protected apparatus, a ground-fault detector-relay for responding to the existence of a ground-fault somewhere in the transmission system, and single-ground detector-means for distinguishing between single line-to-ground faults and double line-to-ground faults somewhere in the transmission system, said single-ground detector-means comprising means for deriving, from the protected apparatus, a first relaying-quantity which is selectively responsive to a negative-sequence electrical quantity of the protected apparatus, means for deriving, from the protected apparatus, a second relaying-quantity which is selectively responsive to a zero-sequence electrical quantity of the protected apparatus, and relaying-means for differentially comparing the magnitudes of said two relaying-quantities in such manner that the second relaying-quantity tends to operate said relaying-means.

15. The combination, with a three-phase apparatus which is a part of a three-phase transmission-system having a zero-phase-sequence impedance which is materially larger than its negative-phase-sequence impedance, of protective-means for reliably distinguishing between a single line-to-ground fault-condition within the protected apparatus and a "through" fault-condition, said protective-means comprising, and being responsive to, a sensitive differential residual-current relay for responding to ground-faults within the protected apparatus, a ground-fault detector-relay for responding to the existence of a ground-fault somewhere in the transmission system, and single-ground detector-means for distinguishing between single line-to-ground faults and double line-to-ground faults somewhere in the transmission system, said single-ground detector-means comprising means for deriving, from the protected apparatus, a first relaying-quantity which is selectively responsive to the negative-sequence voltage of the protected apparatus, means for deriving, from the protected apparatus, a second relaying-quantity which is selectively responsive to the zero-sequence voltage of the protected apparatus, and relaying-means for differentially comparing the magnitudes of said two relaying-quantities in such manner that the second relaying-quantity tends to operate said relaying-means.

16. The combination, with a three-phase apparatus having a zero-phase-sequence impedance which is materially smaller than its negative-phase-sequence impedance, of means for deriving, from the apparatus, a first relaying-quantity which is selectively responsive to a negative-sequence electrical quantity of the apparatus at the relaying-point, means for deriving, from the apparatus, a second relaying-quantity which is selectively responsive to a zero-sequence electrical quantity of the apparatus at the same relaying-point, and relaying-means for differentially comparing the magnitudes of said two relaying-quantities in such manner that the first relaying-quantity tends to operate said relaying-means.

17. The combination, with a three-phase apparatus having a zero-phase-sequence impedance which is materially smaller than its negative-phase-sequence impedance, of means for deriving, from the apparatus, a first relaying-quantity which is selectively responsive to the negative-sequence voltage of the apparatus at the relaying-point, means for deriving, from the apparatus, a second relaying-quantity which is selectively responsive to the zero-sequence voltage of the apparatus at the same relaying-point, and relaying-means for differentially comparing the magnitudes of said two relaying-quantities in such manner that the first relaying-quantity tends to operate said relaying-means.

18. The combination, with a three-phase apparatus which is a part of a three-phase transmission-system having a zero-phase sequence impedance which is materially smaller than its negative-phase-sequence impedance, of protective-means for reliably distinguishing between a single line-to-ground fault-condition within the protected apparatus and a "through" fault-condition, said protective-means comprising, and being responsive to, a differential residual-current relay for responding to ground-faults within the protected apparatus, a ground-fault detector-relay for responding to the existence of a ground-fault somewhere in the transmission system, and single-ground detector-means for distinguishing between single line-to-ground faults and double line-to-ground faults somewhere in the transmission system, said single-ground detector-means comprising means for deriving, from the protected apparatus, a first relaying-quantity which is selectively responsive to a negative-sequence electrical quantity of the protected apparatus, means for deriving, from the protected apparatus, a second relaying-quantity which is selectively responsive to a zero-sequence electrical quantity of the protected apparatus, and relaying-means for differentially comparing the magnitudes of said two relaying-quantities in such manner that the first relaying-quantity tends to operate said relaying means.

19. The combination, with a three-phase apparatus which is a part of a three-phase transmission-system having a zero-phase-sequence impedance which is materially smaller than its negative-phase-sequence impedance, of protective-means for reliably distinguishing between a single line-to-ground fault-condition within the protected apparatus and a "through" fault-condition, said protective-means comprising, and being responsive to, a differential residual-current relay for responding to ground-faults within the protected apparatus, a ground-fault detector-relay for responding to the existence of a ground-fault somewhere in the transmission system, and single-ground detector-means for distinguishing between single line-to-ground faults and double line-to-ground faults somewhere in the transmission system, said single-ground detector-means comprising means for deriving, from the protected apparatus, a first relaying-quantity which is selectively responsive to the negative-sequence voltage of the protected apparatus, means for deriving, from the protected apparatus, a second relaying-quantity which is selectively responsive to the zero-sequence voltage of the protected apparatus, and relaying-means for differentially comparing the magnitudes of said two relaying-quantities in such manner that the first relaying-quantity tends to operate said relaying-means.

20. The combination, with a three-phase apparatus, of means for deriving, from the apparatus, a first relaying-quantity which is selectively responsive to a negative-sequence electrical quantity of the apparatus at the relaying-point, means for deriving, from the apparatus, a second relaying-quantity which is selectively responsive to a zero-sequence electrical quantity of the apparatus at the same relaying-point, means for rectifying each of said relaying-quantities, and polarized relaying-means for differentially comparing the magnitudes of said two rectified relaying-quantities.

21. The combination, with a three-phase apparatus, of means for deriving, from the apparatus, a first relaying-quantity which is selectively responsive to the negative-sequence voltage of the apparatus at the relaying-point, means for deriving, from the apparatus, a second relaying-quantity which is selectively responsive to the zero-sequence voltage of the apparatus at the same relaying-point, means for rectifying each of said relaying-quantities, and polarized relaying-means for differentially comparing the magnitudes of said two rectified relaying-quantities.

22. The combination, with a three-phase apparatus having a zero-phase-sequence impedance which is materially different from its negative-phase-sequence impedance, of means for deriving, from the apparatus, a first relaying-quantity which is selectively responsive to a negative-sequence electrical quantity of the apparatus at the relaying-point, means for deriving, from the apparatus, a second relaying-quantity which is selectively responsive to a zero-sequence electrical quantity of the apparatus at the same relaying-point, means for rectifying each of said relaying-quantities, and polarized relaying-means for differentially comparing the magnitudes of said two rectified relaying-quantities in such manner that the rectified relaying-quantity corresponding to the phase-sequence of the larger of the above-mentioned phase-sequence impedances of the apparatus tends to operate said polarized relaying-means.

23. The combination, with a three-phase apparatus having a zero-phase-sequence impedance which is materially different from its negative-phase-sequence impedance, of means for deriving, from the apparatus, a first relaying-quantity which is selectively responsive to the negative-sequence voltage of the apparatus at the relaying-point, means for deriving, from the apparatus, a second relaying-quantity which is selectively responsive to the zero-sequence voltage of the apparatus at the same relaying-point, means for rectifying each of said relaying-quantities, and polarized relaying-means for differentially comparing the magnitudes of said two rectified relaying-quantities in such manner that the rectified relaying-quantity corresponding to the phase-sequence of the larger of the above-mentioned phase-sequence impedances of the apparatus tends to operate said polarized relaying-means.

24. The combination, with a three-phase apparatus having a zero-phase-sequence impedance which is materially larger than its negative-phase-sequence impedance, of means for deriving, from the apparatus, a first relaying-quantity which is selectively responsive to a negative-sequence electrical quantity of the apparatus at the relaying-point, means for deriving, from the apparatus, a second relaying-quantity which is selectively responsive to a zero-sequence electrical quantity of the apparatus at the same relaying-point, means for rectifying each of said relaying-quantities, and polarized relaying-means for differentially comparing the magnitudes of said two rectified relaying-quantities in such manner that the rectified second relaying-quantity tends to operate said polarized relaying-means.

25. The combination, with a three-phase apparatus having a zero-phase-sequence impedance which is materially larger than its negative-phase-sequence impedance, of means for deriving, from the apparatus, a first relaying-quantity which is selectively responsive to the negative-sequence voltage of the apparatus at the relaying-point, means for deriving, from the apparatus, a second relaying-quantity which is selectively responsive to the zero-sequence voltage of the apparatus at the same relaying point, means for rectifying each of said relaying-quantities, and polarized relaying-means for differentially comparing the magnitudes of said two rectified relaying-quantities in such manner that the rectified second relaying-quantity tends to operate said polarized relaying means.

26. The combination, with a three-phase apparatus having a zero-phase-sequence impedance which is materially smaller than its negative-phase-sequence impedance, of means for deriving, from the apparatus, a first relaying-quantity which is selectively responsive to a negative-sequence electrical quantity of the apparatus at the relaying-point, means for deriving, from the apparatus, a second relaying-quantity which is selectively responsive to a zero-sequence electrical quantity of the apparatus at the same relaying-point, means for rectifying each of said relaying-quantities, and polarized relaying-means for differentially comparing the magnitudes of said two rectified relaying-quantities in such manner that the rectified first relaying-quantity tends to operate said polarized relaying-means.

27. The combination, with a three-phase apparatus having a zero-phase-sequence impedance which is materially smaller than its negative-phase-sequence impedance, of means for deriving, from the apparatus, a first relaying-quantity which is selectively responsive to the negative-sequence voltage of the apparatus at the relaying-point, means for deriving, from the apparatus, a second relaying-quantity which is selectively responsive to the zero-sequence voltage of the apparatus at the same relaying-point, means for rectifying each of said relaying-quantities, and polarized relaying-means for differentially comparing the magnitudes of said two rectified relaying-quantities in such manner that the rectified first relaying-quantity tends to operate said polarized relaying-means.

WILLIAM K. SONNEMANN.